(12) United States Patent
Snyder

(10) Patent No.: US 12,680,501 B2
(45) Date of Patent: Jul. 14, 2026

(54) SYSTEM AND METHOD FOR CONTROLLING CONTRAIL FORMATION

(71) Applicant: RTX Corporation, Farmington, CT (US)

(72) Inventor: Timothy S. Snyder, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/766,334

(22) Filed: Jul. 8, 2024

(65) Prior Publication Data

US 2026/0009358 A1 Jan. 8, 2026

(51) Int. Cl.
*F02C 7/06* (2006.01)
*F02C 9/16* (2006.01)

(52) U.S. Cl.
CPC ................. *F02C 7/06* (2013.01); *F02C 9/16* (2013.01); *F05D 2260/98* (2013.01); *F05D 2270/08* (2013.01); *F05D 2270/3015* (2013.01); *F05D 2270/311* (2013.01)

(58) Field of Classification Search
CPC ..................................... F02C 7/06; F02C 9/16
See application file for complete search history.

(56) References Cited

U.S. PATENT DOCUMENTS

| | | | | |
|---|---|---|---|---|
| 4,050,237 | A | * 9/1977 | Pall | B01D 46/0031 |
| | | | | 55/486 |
| 12,320,263 | B2 | * 6/2025 | Falkus | F02C 7/28 |
| 2009/0025363 | A1 | 1/2009 | Negulescu et al. | |
| 2015/0267617 | A1 | 9/2015 | Suciu et al. | |
| 2015/0284103 | A1 | * 10/2015 | Swann | F02C 9/42 |
| | | | | 701/3 |
| 2018/0156120 | A1 | 6/2018 | Menheere et al. | |
| 2018/0171903 | A1 | 6/2018 | Aronsson et al. | |
| 2018/0252163 | A1 | * 9/2018 | Logan | F02C 7/32 |
| 2019/0211709 | A1 | 7/2019 | Sheridan et al. | |
| 2021/0003206 | A1 | * 1/2021 | Kostka | F01D 25/18 |
| 2024/0167426 | A1 | * 5/2024 | Lincoln | F02C 9/28 |
| 2024/0209789 | A1 | 6/2024 | Bemment et al. | |

OTHER PUBLICATIONS

Partial European Search Report dated Mar. 10, 2026, in connection with European Application No. 25187490.5, 7 pages.

* cited by examiner

*Primary Examiner* — Ted Kim

(57) ABSTRACT
A system includes an engine of an aircraft, an oil buffer tube disposed on a bottom side of the engine, a valve disposed at or near an end of the oil buffer tube, and a control device. The control device is configured to obtain data indicating at least one operational condition associated with the aircraft or the engine. The control device is also configured to, in response to determining a first operational condition, control the valve to a first position, wherein the valve in the first position directs oil buffer air to an exhaust of the engine. The control device is also configured to, in response to determining a second operational condition, control the valve to a second position, wherein the valve in the second position directs the oil buffer air away from the exhaust of the engine.

15 Claims, 6 Drawing Sheets

MINIMIZE OIL FROM ENTRAINING
INTO WARM EXHAUST

LUBRICATION
ATOMIZATION/VAPORIZATION
KEEP OUT ZONE

SENSOR 108

CONTROL DEVICE 110

Loc1

114

BASE

106

104

112

102

100

300

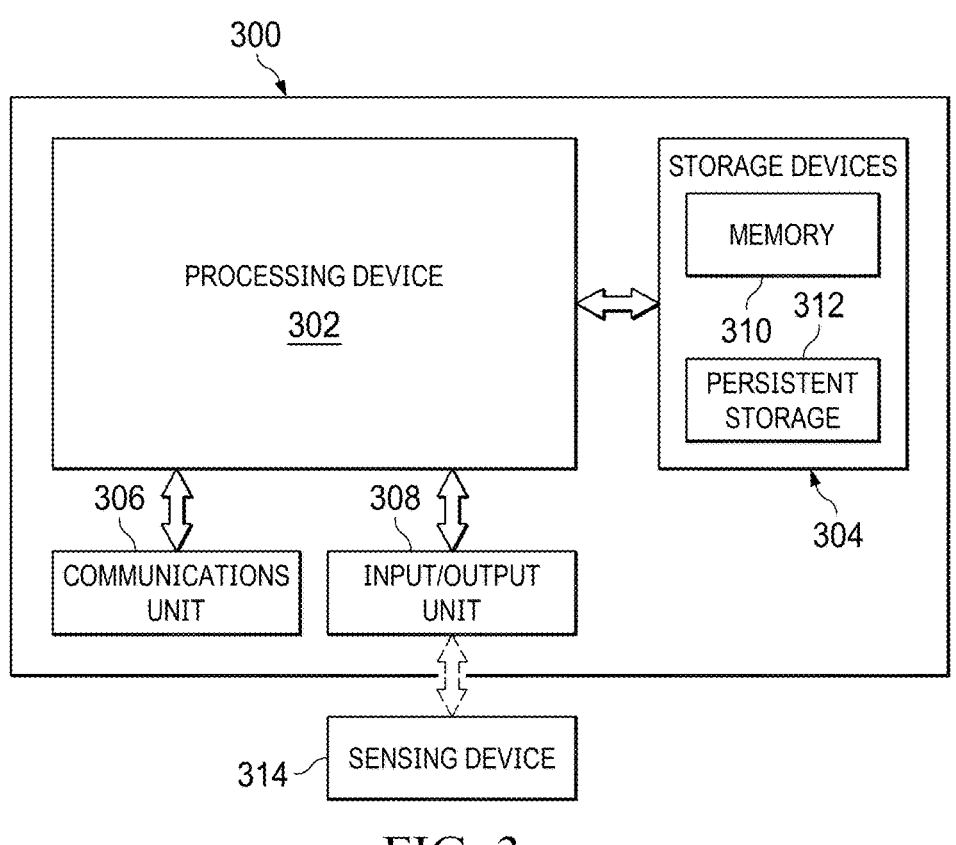

PROCESSING DEVICE
302

STORAGE DEVICES

MEMORY 310　312

PERSISTENT STORAGE

304

306

COMMUNICATIONS UNIT

308

INPUT/OUTPUT UNIT

314

SENSING DEVICE

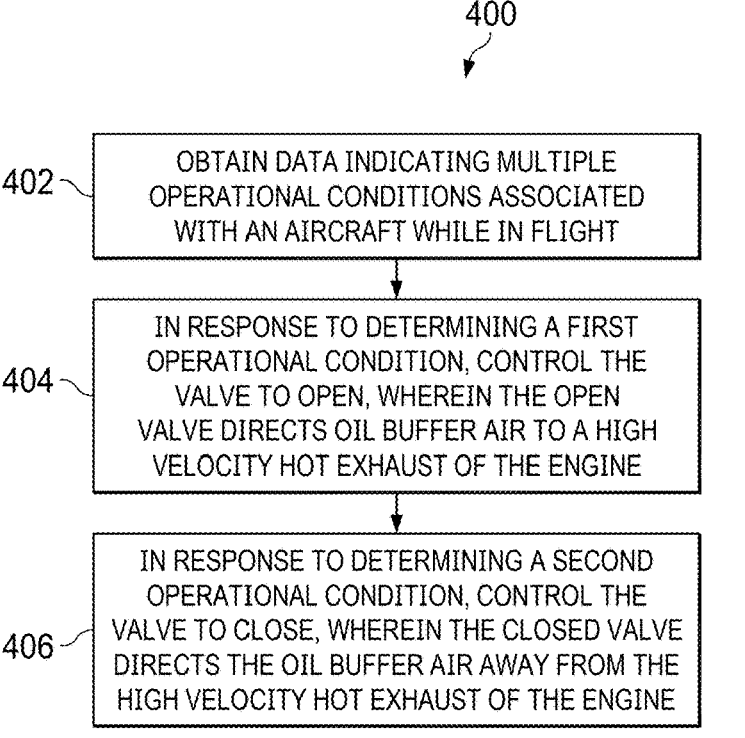

402 — OBTAIN DATA INDICATING MULTIPLE OPERATIONAL CONDITIONS ASSOCIATED WITH AN AIRCRAFT WHILE IN FLIGHT

404 — IN RESPONSE TO DETERMINING A FIRST OPERATIONAL CONDITION, CONTROL THE VALVE TO OPEN, WHEREIN THE OPEN VALVE DIRECTS OIL BUFFER AIR TO A HIGH VELOCITY HOT EXHAUST OF THE ENGINE

406 — IN RESPONSE TO DETERMINING A SECOND OPERATIONAL CONDITION, CONTROL THE VALVE TO CLOSE, WHEREIN THE CLOSED VALVE DIRECTS THE OIL BUFFER AIR AWAY FROM THE HIGH VELOCITY HOT EXHAUST OF THE ENGINE

FIG. 4

SYSTEM AND METHOD FOR CONTROLLING CONTRAIL FORMATION

TECHNICAL FIELD

This disclosure is generally directed to aircraft and airborne vehicles. More specifically, this disclosure is directed to a system and method for controlling contrail formation.

BACKGROUND

The release of engine oil from an in-flight vehicle can increase contrail formation behind the vehicle. Cruise contrail measurements indicate that engine oil may increase ice crystal formation, if the oil is atomized to form nucleation sites. Some experts believe that contrails formed during the day may reduce atmospheric heating by blocking sunlight, while contrails formed during the night may reduce heat loss from the atmosphere. If proven that contrails can, in fact, reduce atmospheric heating during the day, it may be beneficial to control the formation thereof at times when it would be beneficial to the environment, while preventing it at other times (e.g., night, dawn, dusk, etc.).

SUMMARY

This disclosure is directed to system and method for controlling contrail formation.

In a first embodiment, a system includes an engine of an aircraft, an oil buffer tube disposed on a bottom side of the engine, a valve disposed at or near an end of the oil buffer tube, and a control device. The control device is configured to: obtain data indicating at least one operational condition associated with the aircraft or the engine; in response to determining a first operational condition, control the valve to a first position, wherein the valve in the first position directs oil buffer air to an exhaust of the engine; and in response to determining a second operational condition, control the valve to a second position, wherein the valve in the second position directs the oil buffer air away from the exhaust of the engine.

In a second embodiment, a method includes obtaining data indicating at least one operating condition associated with at least one of an aircraft or an engine of the aircraft. The method also includes, in response to determining a first operational condition, controlling a valve to a first position, the valve disposed at or near an end of an oil buffer tube disposed on a bottom side of the engine, wherein the valve in the first position directs oil buffer air to an exhaust of the engine. The method further includes, in response to determining a second operational condition, controlling the valve to a second position, wherein the valve in the second position directs the oil buffer air away from the exhaust of the engine.

In a third embodiment, a control device includes at least one processing device configured to: receive data indicating an operational condition associated with at least one of an aircraft or an engine associated with the aircraft; and based at least in part on the data, control a valve associated with an oil buffer tube disposed on a bottom side of the engine to a first position, wherein the valve in the first position is configured to direct oil buffer air to an outlet located on an outer surface of a nacelle associated with the engine.

In various aspects of the first, second, or third embodiment, the first operational condition can include a differential pressure (DP) across an oil seal being less than a predetermined threshold pressure, and the second operational condition can include the DP across the oil seal being greater than the predetermined threshold pressure. The first operational condition can include a time of day associated with daytime, and the second operational condition can include a time of day associated with nighttime. The first operational condition can include a first humidity level below a threshold humidity level associated with contrail formation, and the second operational condition can include a second humidity level that is above the threshold humidity level associated with contrail formation. The second humidity level can be representative of an ice-supersaturation region proximate the aircraft. The data can be obtained from at least one sensor disposed within or adjacent to a housing of the engine. The data can be obtained from at least one sensor located remote from the aircraft. The at least one operational condition can include at least one of: a pressure inside the oil buffer tube; an ambient pressure outside the aircraft; a pressure differential across an oil seal; a temperature of the air outside the aircraft; a humidity of the air outside the aircraft; a time of day; or an indication of sunlight.

The outlet can be located at a location on the nacelle associated with a minimal static pressure. The at least one processing device can be configured to: receive additional data indicating a change to the operational condition associated with the at least one of the aircraft or the engine; and based at least in part on the additional data, control the valve to a second position, wherein the valve in the second position is configured to direct oil buffer air to an exhaust of the engine. The data can be received from at least one of: a sensor disposed within or adjacent to a housing of the engine; or at least one sensor located remote from the aircraft. The first position can be associated with minimizing the formation of contrails by the engine during a flight.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 3 illustrates an example device for use in a system for controlling contrail formation according to this disclosure; and FIG. 4 illustrates an example method for controlling contrail formation according to this disclosure.

DETAILED DESCRIPTION

FIGS. 1A through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, the release of engine oil from an in-flight vehicle can increase contrail formation behind the vehicle. Cruise contrail measurements indicate that engine oil may increase ice crystal formation, if the oil is atomized to form nucleation sites. Some experts believe that contrails formed during the day may reduce atmospheric heating, while contrails formed during the night may reduce heat loss from the atmosphere. To lessen the environmental impact of aviation, there may be a benefit in preventing contrail formation, at least during flight and operational conditions in which the contrails may be harmful to the environment.

This disclosure provides systems and methods for controlling contrail formation, such as, by optimizing engine seal differential pressure (DP) at particular flight operational conditions. The disclosed embodiments can be used with an aviation engine, such as a turbofan engine. As discussed in greater detail below, the disclosed embodiments include bypass piping and at least one valve that can direct oil buffer air to the high velocity hot exhaust (the "exhaust"). The valve can be opened to form contrails or closed to prevent or minimize contrail formation. Note that while this disclosure is described with respect to aviation gas turbine engines, it will be understood that the principles disclosed here are also applicable to other types of devices or environments.

Figure 1A:
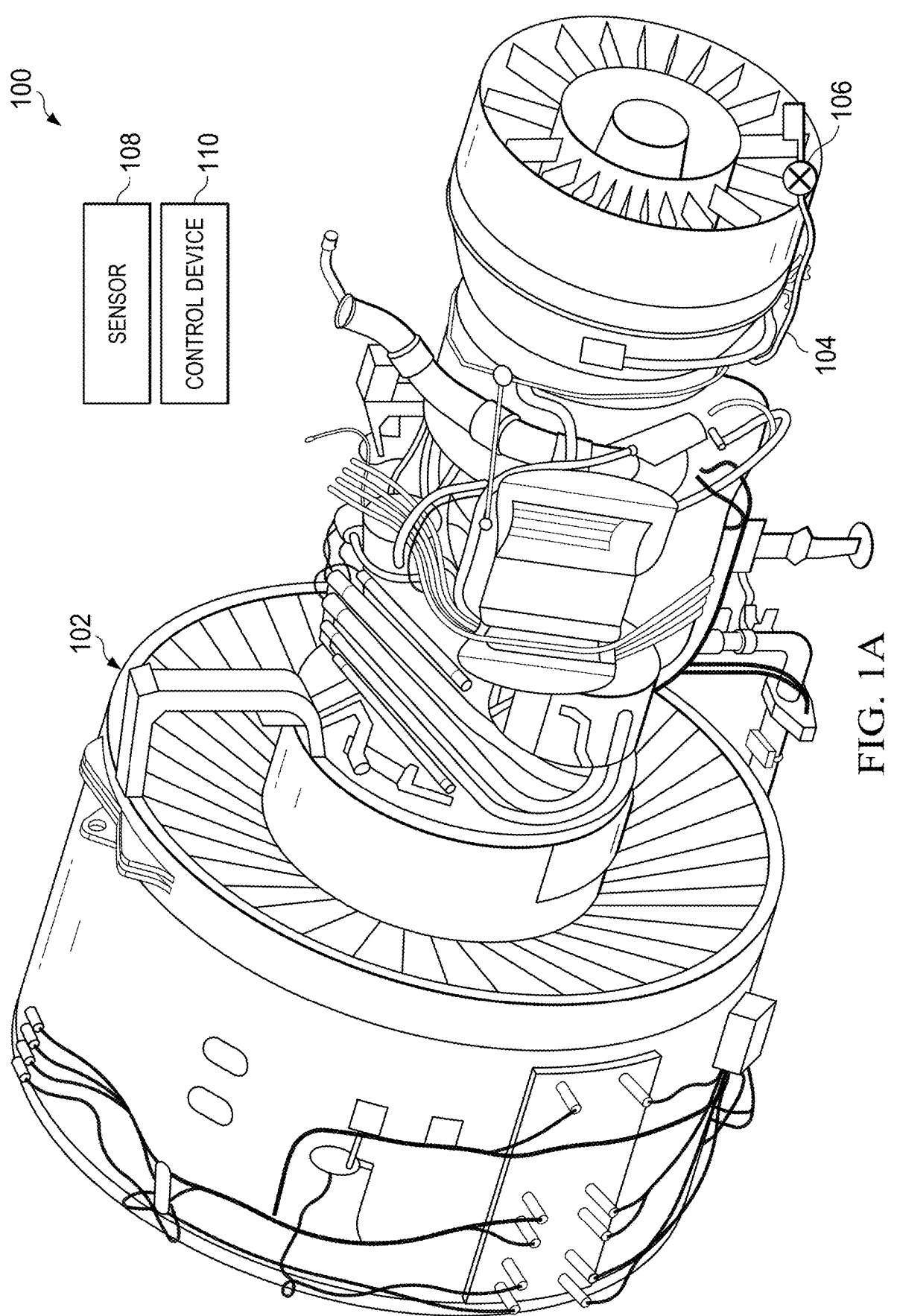
FIGS. 1A through 1C illustrate an example system for controlling contrail formation according to this disclosure.
Figure 1B:
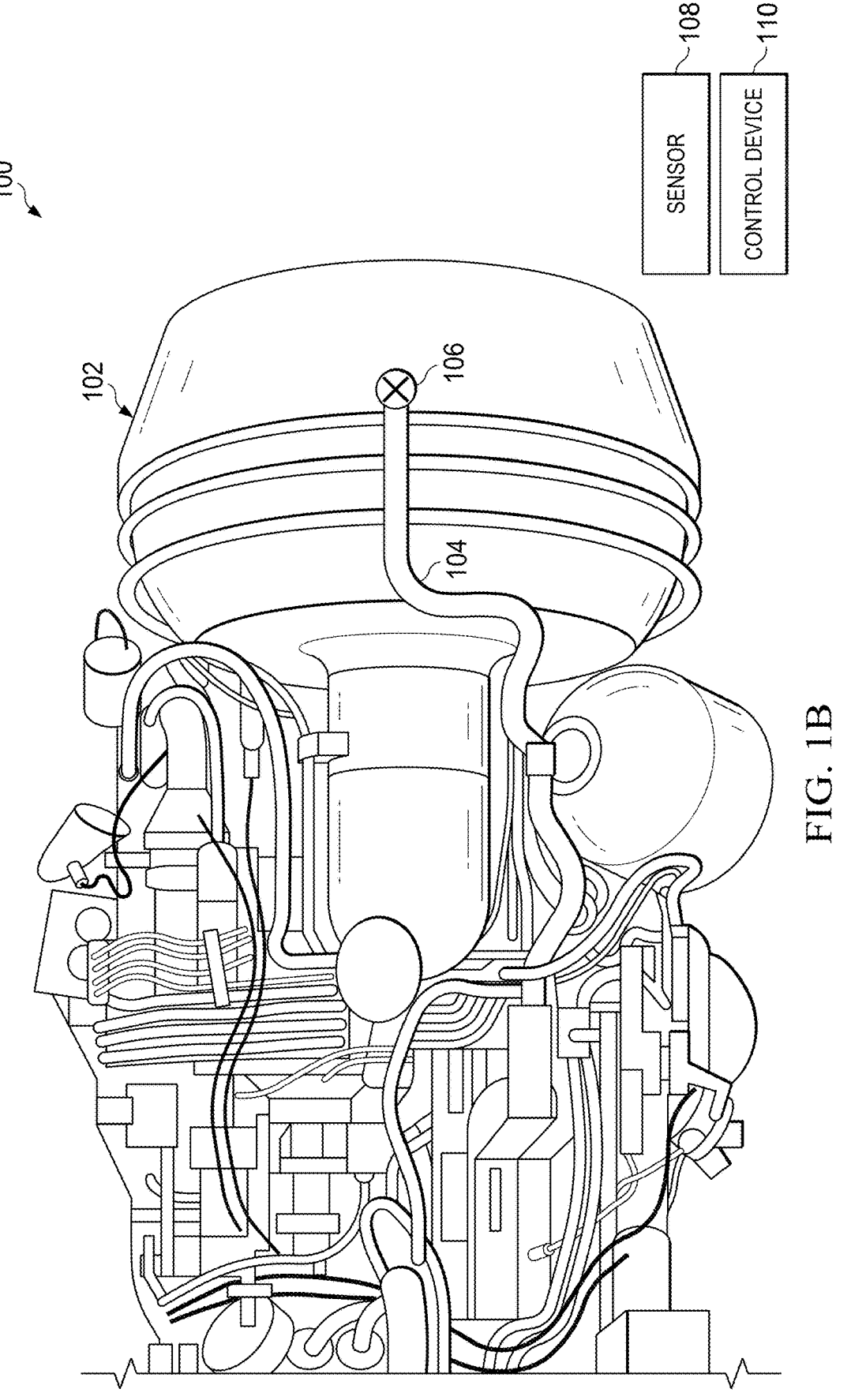
Figure 1C:
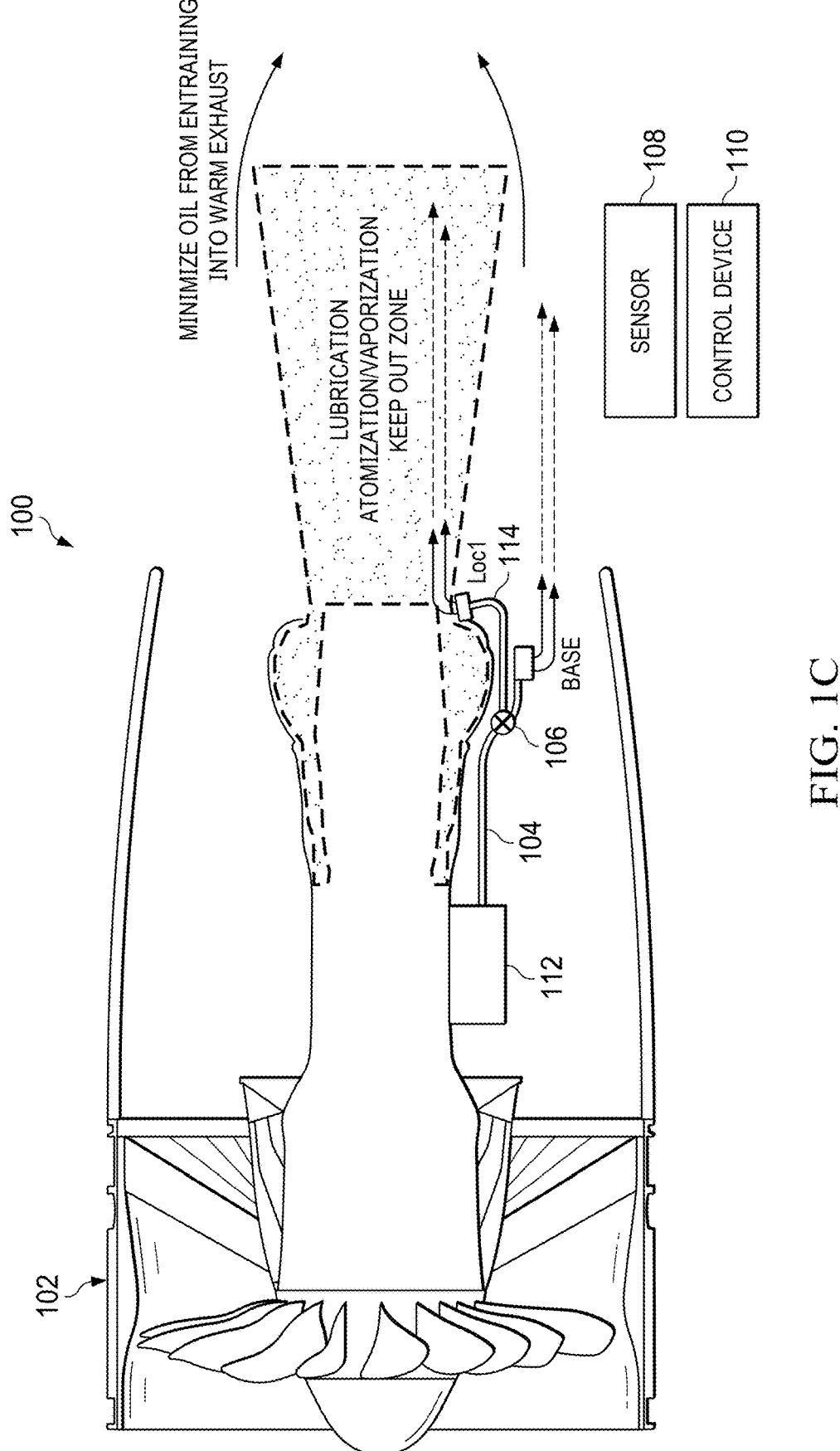

FIGS. 1A through 1C illustrate an example system 100 for controlling contrail formation according to this disclosure. In particular, FIG. 1A shows a perspective view of the system 100, FIG. 1B shows a bottom view of the system 100, and FIG. 1C shows a side view of the system 100.

As shown in FIGS. 1A through IC, the system 100 includes an engine 102, an oil buffer tube 104, a valve 106, at least one sensor 108, and at least one control device 110. The engine 102 is an aviation engine that forms a portion of an aircraft or flight vehicle. In some embodiments, the engine 102 is a turbofan engine, though other turbine, piston, or other engines are contemplated herein and are within the scope of this disclosure.

The oil buffer tube 104 is an "air breather" pipe disposed on the bottom side of the engine 102 and extends from a gearbox 112 of the engine 102 rearward toward an exit located near the exhaust of the engine 102. The oil buffer tube 104 transports buffer air away from the gearbox 112. The buffer air contains air with some amount of engine oil. The engine exhaust contains large amounts of water vapor, Typically, the buffer air contains small amounts of water vapor, non-volatile particulate matter (e.g., carbon particles), volatile particular matter (unburned hydrocarbons and, sulfur from the fuel, and engine oil), or a combination of these. Studies have shown that contrails can be reduced if the nvPM and vPM levels are reduced.

The valve 106 is a two-way (e.g., open/close) valve disposed along the oil buffer tube 104 upstream of the baseline ("Base") and location 1 ("Loc1"). The valve 106 is provided to direct oil buffer air carried through the oil buffer tube 104 to control contrail formation. As described in greater detail below, the valve 106 can direct the oil buffer air to the exhaust Loc 1 through bypass piping 114 so that the oil is atomized by the hot exhaust to form nucleation sites that promote ice crystal formation and growth of contrails. The valve 106 can be opened to direct the oil buffer air to the BASE location so that the oil does not enter the hot exhaust to minimize contrail formation. In some embodiments, the valve 106 can be opened to direct the flow to Loc 1 through tube 114 during daytime flights to form contrails or to the BASE location during the night to prevent contrail formation. The downstream static pressure of the BASE location is lower than the static pressure at Loc 1. This lower static pressure increases the pressure drop across engine seals to prevent oil leakage. One example when the seals have a very low pressure drop is at initial decent. At this condition, the oil buffer air can be directed to the base location to increase seal DP, reducing oil loss. In some embodiments, the valve 106 can direct the oil to the BASE location at night or during other operational conditions to prevent or minimize contrail formation.

To determine whether to enable or prevent contrail formation, the engine 102 may include one or more sensors 108. The sensor(s) 108 may be disposed within or adjacent to a nacelle of the engine 102, may be mounted on the aircraft away from the engine 102 (e.g., mounted on the fuselage), and/or may be remote to the aircraft (e.g., a ground-based weather sensor, satellite-based weather sensor, etc.). The sensor(s) 108 measure one or more operational conditions associated with the engine 102 and/or the aircraft. The operational conditions can include bypass piping 114 pressure, oil seal DP, time of day, an indication of sunlight (e.g., UV detection), a power setting, atmospheric conditions (e.g., temperature, pressure, humidity, presence of supersaturation regions, etc.), or a combination of these.

The control device 110 is provided to obtain operational data related to the engine 102 and/or the aircraft from the sensor(s) 108, and to control the valve 106 according to the obtained data. For example, the control device 110 can receive sensor measurements from the sensor(s) 108, such as time of day, weather and atmospheric condition data from an aircraft-based or remote weather service, any other suitable operational data, or a combination of these. Based on the obtained data, the control device 110 can determine whether the valve 106 should be open or closed, and then control the valve 106 according to that determination.

In one aspect of operation, the control device 110 operates in a control loop to determine when the valve 106 should be in a first position to prevent contrail formation or a second position to encourage contrail formation in order to maximize environmental benefits thereof. For example, the control device 110 can receive time of day information from a clock source. The time of day can be used by the control device 110 to control the valve 106 in order to determine contrail formation. During daytime, it may be desirable to form contrails, and so the control device 110 can open the valve 106 to divert the oil-containing buffer air to the exhaust, thereby promoting contrail formation. In contrast, at nighttime, contrails may not be desirable, so the control device 110 can close the valve 106 to keep the buffer air from the exhaust.

As another example, the control device 110 can receive humidity information or other weather information from a humidity sensor 108 or a weather service. The weather information can indicate the presence of a supersaturation region in the flight path. If the aircraft is in a supersaturation region, then conditions may be favorable for generating contrails, and the control device 110 can open the valve 106 to promote contrail formation. If the aircraft is not in a supersaturation region, then conditions may not be favorable for generating contrails, and the control device 110 can close the valve 106.

Additionally, the control device 110 may be configured to operate the valve 108 to maintain a minimum differential of pressure across an oil seal in the engine 102. In some embodiments, back pressure on an oil seal within an engine 102 may be generated from compressor bleed air. That is, air bled from a compressor section of the engine 102 may be used to generate pressure on one side of a seal, the back pressure being higher than the pressure on the other side of the seal (e.g., atmospheric pressure, static pressure, etc.), thereby causing at least a minimum DP across the seal.

However, at certain pinch points, such as when power is reduced substantially on the engine 102, such as in transition from cruise to descent, the back pressure on the oil seal may reduce, thereby decreasing the DP across the seal. In some situations, the decrease in DP may cause leakage across the seal. The sensor(s) 108 may be configured to measure the DP across the oil seal and send the pressure data to the control device 110. The control device 110 can compare the oil seal DP to a threshold pressure differential. Based on a determination that the oil seal DP is low, the control device 110 can control the valve 106 to open, causing higher pressure air to be routed to the seal to increase the DP above the minimum threshold pressure differential. If the control device 110 determines that the oil seal DP is above the minimum threshold, the control device 110 can control the valve 106 to close or maintain a closed position.

As discussed above, the control device 110 may consider multiple operational conditions when determining to open or close the valve 106. Some of these operational conditions may be in conflict with each other. For example, a low oil seal DP may indicate that the valve 106 should be open, while a time of day may indicate that the valve 106 should be closed. Therefore, the control device 110 can assign a priority to each operational condition and control the valve 106 based on higher priority operational conditions.

Although FIGS. 1A through 1C illustrate an example system for controlling contrail formation and maximizing engine seal differential pressure at particular flight operational conditions and related details, various changes may be made to FIGS. 1A through 1C. For example, while FIGS. 1A through IC show one sensor 108 and one control device 110, actual implementations can include other numbers of sensors 108 and control devices 110. In addition, various components shown and described above may be combined, further subdivided, replicated, rearranged, or omitted and additional components may be added according to particular needs.

Figure 2A:
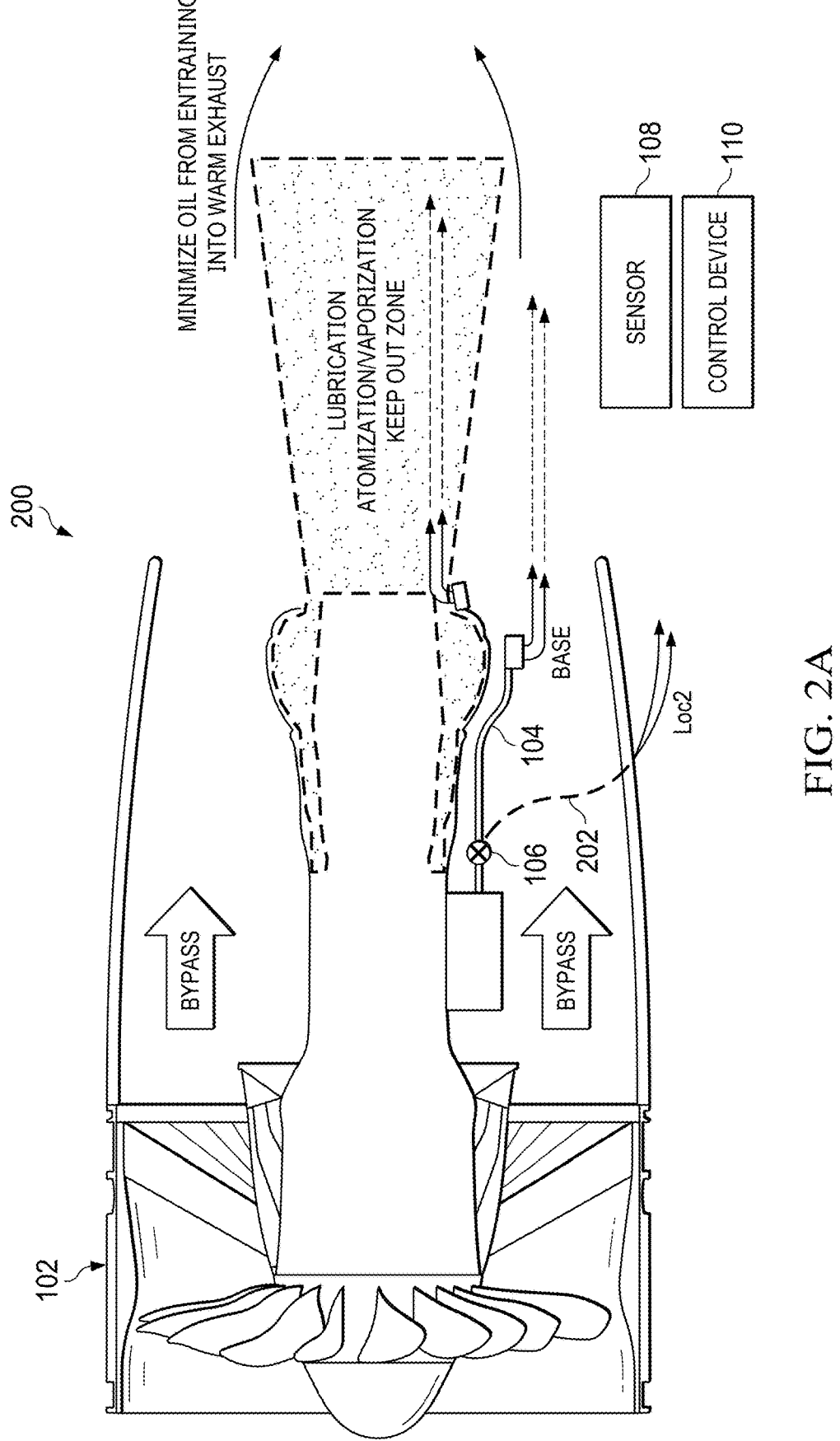
FIGS. 2A and 2B illustrate another example system for controlling contrail formation according to this disclosure.
Figure 2B:
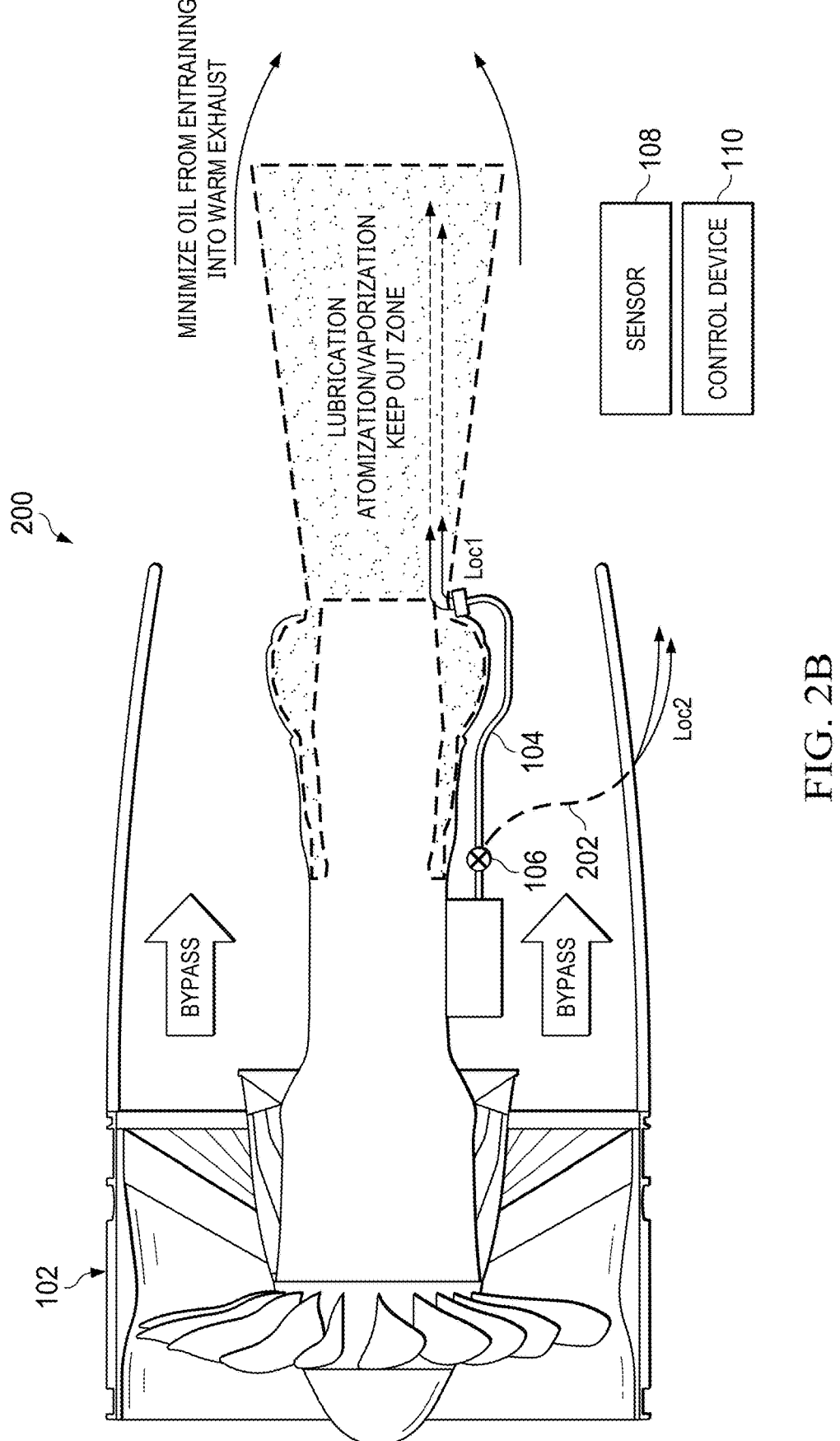

FIGS. 2A and 2B illustrate another example system 200 for controlling contrail formation and maximizing engine seal differential pressure at particular flight operational conditions according to this disclosure. As shown in FIGS. 2A and 2B, the system 200 includes multiple components that are the same as, or similar to, corresponding components of the system 100 shown in FIGS. 1A through IC. In FIG. 2A, the oil buffer tube 104 extends to the baseline ("Base"). In FIG. 2B, the oil buffer tube 104 extends to Location 1 ("Loc1").

As discussed above, in some aircraft, the oil buffer air exits are inboard of the bypass air stream between the nacelle ducts. In these conditions, oil could be entrained into the hot exhaust, resulting in oil atomization at cruise. To avoid this situation, the system 200 includes an extension 202 to the oil buffer tube 104 to a second location ("Loc2").

Loc2 may represent a location outside of the bypass air stream with a low static pressure. For example, Loc2 may be a location in the slipstream that experiences a high Mach number and low static pressure. In some embodiments, Loc2 may include a location along a nacelle of the engine 102 in which the mach number is maximized and thus static pressure is minimized. Additionally, the distance from the exhaust and heat associated therewith may further assist in preventing atomization and contrail formation. In at least one embodiment, Loc2 may represent a preferred location for routing oil buffer air to minimize or prevent contrail formation.

In some examples, it may be preferable to prevent the formation of contrails throughout a flight. In such examples, the valve 106 may be positioned (by the control device 110) to continuously route oil buffer air to Loc2 continuously throughout the flight, thereby minimizing the potential for contrail formation.

FIG. 3 illustrates an example device 300 for use in a system for controlling contrail formation and maximizing engine seal differential pressure at particular flight operational conditions, according to this disclosure. One or more instances of the device 300 may, for example, be used to at least partially implement the functionality of the control device 110 of FIGS. 1A through IC. However, the functionality of the control device 110 may be implemented in any other suitable manner. Also, the same or similar arrangement of components may be used to at least partially implement the functionality of the control device 110 in FIGS. 1A through 1C. However, the functionality of a control device 110 may be implemented in any other suitable manner.

As shown in FIG. 3, the device 300 denotes a computing device or system that includes at least one processing device 302, at least one storage device 304, at least one communications unit 306, and at least one input/output (I/O) unit 308. The processing device 302 may execute instructions that can be loaded into a memory 310. The processing device 302 includes any suitable number(s) and type(s) of processors or other devices in any suitable arrangement. Example types of processing devices 302 include one or more microprocessors, microcontrollers, digital signal processors (DSPs), application specific integrated circuits (ASICs), field programmable gate arrays (FPGAs), or discrete circuitry. This can be part of a separate computer system used for data acquisition and post processing, or it can be configured as a separate unit mounted on an engine for real time processing of engine data.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 can include a network interface card or a wireless transceiver facilitating communications over a wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also provide a connection for at least one sensing device 314 that can be used for measuring and monitoring operational conditions in a flight vehicle, such as described above. In some embodiments, the sensing device 314 can represent one or more of the sensors 108. The I/O unit 308 may also send output to a display, printer, or other suitable output device. In some embodiments, the I/O unit 308 may include a communications interface configured to receive data from remote sensors, such as a ground-based weather system or satellite-based weather system.

In some embodiments, the instructions executed by the processing device 302 can include instructions that implement the functionality of the control device 110 described above. For example, the instructions executed by the processing device 302 can include instructions for controlling the valve 106.

Although FIG. 3 illustrates one example of a device 300 for use in a thermal imaging system, various changes may be made to FIG. 3. For example, computing devices and systems come in a wide variety of configurations, and FIG. 3 does not limit this disclosure to any particular computing device or system. Additionally, device 300 may be embedded in or a portion of an engine controller, such as a full authority digital engine controller (FADEC) or electronic engine controller (EEC), both of which are known in the field. That is, the FADEC and/or the EEC may be configured to perform the functions of device 300 and/or control device 110.

FIG. 4 illustrates an example method 400 for controlling contrail formation and maximizing engine seal differential pressure at particular flight operational conditions according to this disclosure. For ease of explanation, the method 400 is described as being performed using the system 100 of FIGS. 1A through IC. However, the method 400 could be used with any other suitable device or system.

As shown in FIG. 4, at step 402, data is obtained that indicates at least one operational condition associated with an aircraft in flight. This may include, for example, the control device 110 obtaining data from one or more sensors 108 disposed within or adjacent to a housing of the engine 102 or located remote from the aircraft (e.g., ground or satellite-based system).

At step 404, a valve is controlled to a first position in response to determining a first operational condition. The valve is disposed at or near an end of an oil buffer tube disposed on a side of an engine of the aircraft. In some embodiments, the oil buffer tube may be disposed on a bottom side of the engine. In the first position, the valve directs oil buffer air to an exhaust of the engine. This may include, for example, the control device 110 controlling the valve 106 to the first position, such as in response to determining that the first operational condition is indicative of a condition in which the formation of contrails would be beneficial to the environment. In another example, the control device 110 may control the valve to the first position in response to determining that the DP across an oil seal is less than a predetermined threshold pressure.

At step 406, the valve is controlled to a second position in response to determining a second operational condition. In the second position, the valve directs the oil buffer air away from the exhaust of the engine. This may include, for example, the control device 110 controlling the valve 106 to the second position, such as in response to determining that the second operational condition is indicative of a condition in which preventing contrails would result in the greatest benefit to the environment. In another example, the control device 110 may control the valve to the second position in response to determining that the DP across the oil seal is greater than the predetermined threshold pressure.

Although FIG. 4 illustrates one example of a method 400 for controlling contrail formation and maximizing engine seal differential pressure at particular flight operational conditions, various changes may be made to FIG. 4. For example, while shown as a series of steps, various steps shown in FIG. 4 could overlap, occur in parallel, occur in a different order, or occur multiple times. Moreover, some steps could be combined or removed, and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:

an engine of an aircraft having a hot exhaust nozzle to exhaust hot exhaust gas flow;

an oil buffer tube disposed on a bottom side of the engine;

a valve disposed near an end of the oil buffer tube; and a control device configured to:

obtain data indicating at least one operational condition associated with the aircraft or the engine;

in response to determining a first operational condition, control the valve to a first position, wherein the valve in the first position directs oil buffer air to a first portion of the oil buffer tube arranged in a first direction towards the hot exhaust nozzle and a lubrication atomization zone in the hot exhaust gas flow of the engine to atomize oil in the oil buffer air and to promote contrail formation; and in response to determining a second operational condition, control the valve to a second position, wherein the valve in the second position directs the oil buffer air to a second portion of the oil buffer tube arranged in a second direction to exhaust the oil buffer air into a surrounding airflow and away from the hot exhaust nozzle and the lubrication atomization zone of the engine to minimize contrail formation.

2. The system of claim 1, wherein:

the first operational condition comprises a differential pressure (DP) across an oil seal being less than a threshold pressure; and the second operational condition comprises the DP across the oil seal being greater than the threshold pressure.

3. The system of claim 1, wherein:

the first operational condition comprises a time of day associated with daytime; and the second operational condition comprises a time of day associated with nighttime.

4. The system of claim 1, wherein:

the first operational condition comprises a first humidity level that is below a threshold humidity level associated with contrail formation; and the second operational condition comprises a second humidity level that is above the threshold humidity level associated with contrail formation.

5. The system of claim 4, wherein the second humidity level is representative of an ice-supersaturation region proximate the aircraft.

6. The system of claim 1, wherein the data is obtained from at least one sensor disposed within or adjacent to a housing of the engine.

7. The system of claim 1, wherein the data is obtained from at least one sensor located remote from the aircraft.

8. The system of claim 1, wherein the at least one operational condition comprises at least one of:

a pressure inside the oil buffer tube;

an ambient pressure outside the aircraft;

a pressure differential across an oil seal;

a temperature of the air outside the aircraft;

a humidity of the air outside the aircraft;

a time of day; or an indication of sunlight.

9. A method comprising:

obtaining data indicating at least one operational condition associated with at least one of an aircraft or an engine of the aircraft having a hot exhaust nozzle to exhaust hot exhaust gas flow;

in response to determining a first operational condition, controlling a valve to a first position, the valve disposed near an end of an oil buffer tube disposed on a bottom side of the engine, wherein the valve in the first position directs oil buffer air to a first portion of the oil buffer tube arranged in a first direction towards the hot exhaust nozzle and a lubrication atomization zone in the hot exhaust gas flow of the engine to atomize oil in the oil buffer air and to promote contrail formation; and in response to determining a second operational condition, controlling the valve to a second position, wherein the valve in the second position directs the oil buffer air to a second portion of the oil buffer tube arranged in a second direction to exhaust the oil buffer air into a surrounding airflow and away from the hot exhaust nozzle and the lubrication atomization zone of the engine to minimize contrail formation.

10. The method of claim 9, wherein:

the first operational condition comprises a differential pressure (DP) across an oil seal being less than a threshold pressure; and the second operational condition comprises the DP across the oil seal being greater than the threshold pressure.

11. The method of claim 9, wherein:

the first operational condition comprises a time of day associated with daytime; and the second operational condition comprises a time of day associated with nighttime.

12. The method of claim 9, wherein:

the first operational condition comprises a first humidity level that is below a threshold humidity level associated with contrail formation; and the second operational condition comprises a second humidity level that is above the threshold humidity level associated with contrail formation.

13. The method of claim 12, wherein the second humidity level is representative of an ice-supersaturation region proximate the aircraft.

14. The method of claim 9, wherein the data is obtained from at least one sensor disposed within or adjacent to a housing of the engine.

15. The method of claim 9, wherein the data is obtained from at least one sensor located remote from the aircraft.

* * * * *